Dec. 14, 1965  W. W. DALRYMPLE  3,223,462
ENDLESS TRACK FOR A TRACK LAYING VEHICLE
Filed April 25, 1963  2 Sheets-Sheet 1

INVENTOR.
WAYNE W. DALRYMPLE
BY *Ronald W. Mayes*
ATTORNEY

Dec. 14, 1965  W. W. DALRYMPLE  3,223,462
ENDLESS TRACK FOR A TRACK LAYING VEHICLE
Filed April 25, 1963  2 Sheets-Sheet 2

INVENTOR.
WAYNE W. DALRYMPLE
BY
ATTORNEY

United States Patent Office 3,223,462
Patented Dec. 14, 1965

3,223,462
ENDLESS TRACK FOR A TRACK LAYING
VEHICLE
Wayne W. Dalrymple, Wichita, Kans., assignor to The
Boeing Company, Wichita, Kans., a corporation of
Delaware
Filed Apr. 25, 1963, Ser. No. 275,555
15 Claims. (Cl. 305—34)

This invention relates to an endless track for a track laying vehicle.

Among the objects of this invention is the provision of a novel and improved endless track for a track laying vehicle that provides good roadability on all types of terrain particularly on hard surface roads that are desired to remain substantially unmarred by the passage of the vehicle; a novel track that provides good traction in a forward and a reverse direction, a novel track that provides good braking action, and/or a novel track that pivots easily for giving good turnability of the vehicle.

Another object of this invention is the provision of an endless track that is of simple configuration, economical to manufacture, and/or easy to repair or replace components thereof.

Another object of this invention is the provision of a novel endless track for a track laying vehicle and comprising a plurality of optimumly spaced grousers strung on a plurality of endless cables, the grousers being held in spaced relationship by tubular spacers strung on the cables with at least some of the spacers each carrying a resilient tire.

A still further object of this invention is the provision of a novel endless track for a track laying vehicle comprising a plurality of transverse grousers strung along a plurality of cables held in spaced apart relationship by spacers, some of the spacers each carrying turnable tires of sufficiently great diameter to extend beyond the grousers for engaging the terrain or road.

A still further object of this invention is the provision of a novel endless track adapted to be driven by a sprocket wheel and held in engagement with the ground surface by a plurality of bogie wheels, the endless track comprising a plurality of endless cables having grousers strung thereon and held in spaced apart relationship by tubes strung on the cables, with at least some of the tubes each carrying a resilient tire having an axis of rotation extending in the direction of travel of the endless track.

A still further object of this invention is the provision of a novel endless track as set forth in the preceding object, wherein each pair of resilient tires are adapted to be squeezed together by the wheels for mutually braking each other against turning; the track having the advantages of braking against sideslip in a lateral direction and yet providing rollable tires for easier turning of the endless track, of providing increased road engaging tread area when the load on the tires is increased, of providing increased track area should the tires sink into the earth, or should the weight on the track so greatly exceed the resistance of the tires that the grousers are forced into engagement with the road surface, and/or of providing additional traction as well as additional resistance to sideslip and skidding.

The invention further resides in certain novel features of construction, combinations, and arrangements of parts, and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
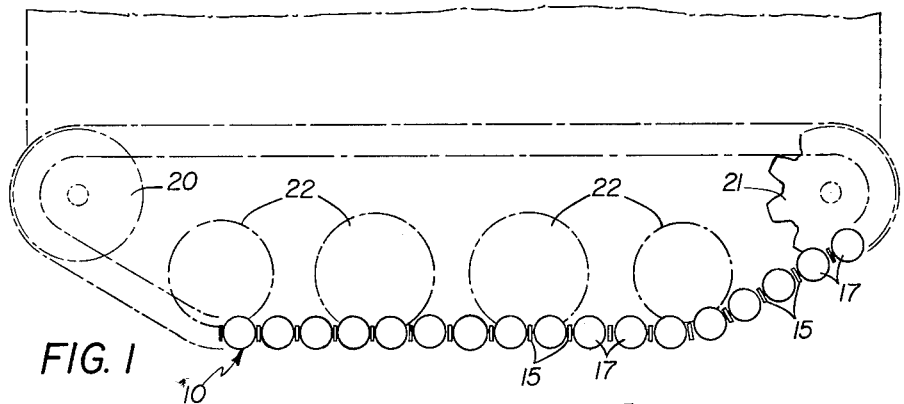
FIG. 1 is a partial side elevational view of a track laying vehicle having an endless track embodying this invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Figure 2:
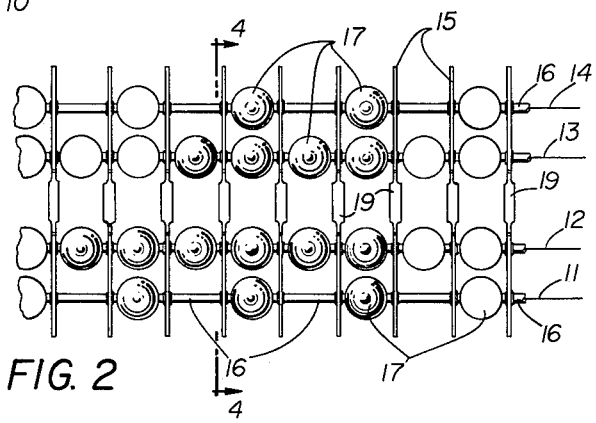
FIG. 2 is a plan view of a portion of the endless track.

Referring to FIGS. 1 and 2, reference numeral 10 indicates generally an endless track embodying this invention. The endless track 10 comprises four endless cables or annuluses 11, 12, 13, and 14. The track 10 has a plurality of transverse grousers 15, sometimes referred to as studs, cross bars, flanges, and grouters. The grousers 15 are strung on the cables 11, 12, 13, and 14. The grousers 15 each have four laterally spaced holes for permitting the cables 11, 12, 13, and 14 to pass therethrough. Each of the grousers 15 is held in longitudinally spaced relationship by means of four lengths or segments of metal tubes 16 respectively strung on the cables 11, 12, 13, and 14. The tubes 16 are of a greater diameter than the cables 11, 12, 13, and 14 so as to permit the rotation of the tubes thereon. Each one of the tubes 16 carries a resilient tire 17 having a tubular metal insert 18 which is preferably rotatably mounted on the tube 16 for self-cleaning rotative relationship relative thereto. However it is understood that the tires 17 may, if desired, tightly embrace the tubes 16 for better braking against sideslip, although for most purposes, friction between the tubes 16 and 18 provide adequate braking against sideslip.

The tires 17 may also be referred to as treads, balls, rollers, wheels, or brakes, due to their inherent shape and/or functions. The tires 17 are preferably of a resilient material for good braking and turning action, and for good roadability. The resilient material of the tires 17 when made of rubber or an elastomer provides good track to road friction for better drive and braking traction and for resisting sideslip. However, it is understood that the tires 17 may be of a metallic or non-metallic synthetic composition or any other desired material or combinations of materials depending upon the characteristics desired by the user.

The center of each of the grousers 15 is provided with a sprocket engaging element 19. The elements 19 are integrally connected to the grousers 15. The element 19 may be completely cylindrical, or preferably have only one side cylindrical or rounded for meshing engagement with drive wheels 20 and 21, of a track laying vehicle 22. Each drive wheel 20, 21 is preferably of a conventional toothed configuration and is preferably made of, or covered with, a resilient and tough nonmetallic material so as to provide a quiet drive. It is to be understood however that the drive wheels need not have sprockets inasmuch as the track 10 can be driven by frictional contact with drive wheels made of rubber or a suitable synthetic material.

Preferably, two pairs of bogie wheels, indicated generally by reference numeral 22, urge the ground engaging portion of each endless track 10 into close adherence with the ground or road surface in the performance of the well known function thereof. The grousers 15 and more particularly the elements 19 each have upwardly extending U-shaped or horseshoe-shaped projections 19a for aligning and guiding the track 10 relative to the bogie wheels 22 and the sprocket wheels 20, 21. Preferably the guides 19a conform to the contour of the tires of the bogies 22.

The grousers 15 are preferably of elongated rectangular configuration without any adornment for economy of manufacture. The lateral ends of the grousers 15 are spherically radiused. All sharp edges of the grousers 15 are broken. The tubes 16 have spherically shaped ends 24 preferably seated in semispherical concavities or receptacles 25 of the grousers 15 in order to give the track 10 added flexibility. The flexibility feature permits the track 10 to bend around wheels of a shorter radii than would be otherwise possible. It is noteworthy that the track 10 is laid down chiefly by forces in compression since the cables 11, 12, 13, 14 may only frictionally engage the grousers 15 and the tubes 16. Accordingly the tubes 16 must be designed to withstand high compression forces. If the tubes are made too long, the tubes 16 could flex or fail in bending since they are essentially columns and Euler's Law for columns having rounded ends applies. Moreover, lengthening of the tubes 16 reduces flexibility of the track 10 and increases the minimum required diameter of the sprocket wheels 20, 21 and increases the spacing of the sprocket teeth to accommodate the increased distance between the grousers 15.

In order to provide added traction performance of the track 10 in soft terrain a tire 17 is omitted from every other tube 16 strung onto the two cables 11 and 14. The cables 11 and 14 may be referred to as the two outer cables of the track 10 while the cables 12 and 13 may be referred to as the inner cables. The removal of every other tire 17 however reduces the resistance of the track 10 to sideslip, particularly on hard surface.

Figure 3:
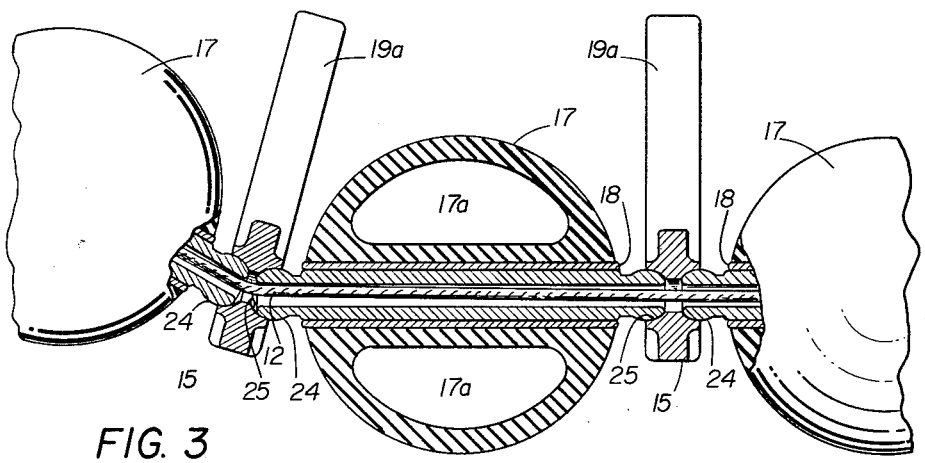
FIG. 3 is an enlarged fragmentary side elevational view of the track with parts broken away and shown in section.
Figure 4:
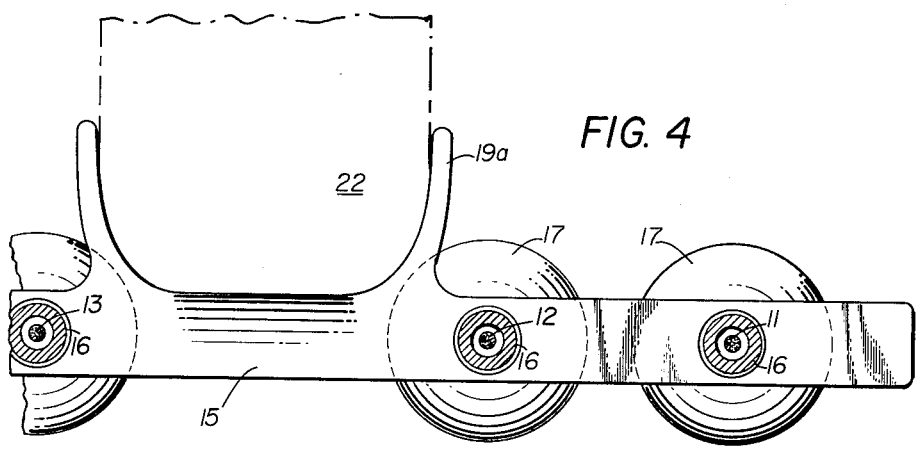
FIG. 4 is an enlarged view along line 4—4 in FIG. 2.
Figure 5:
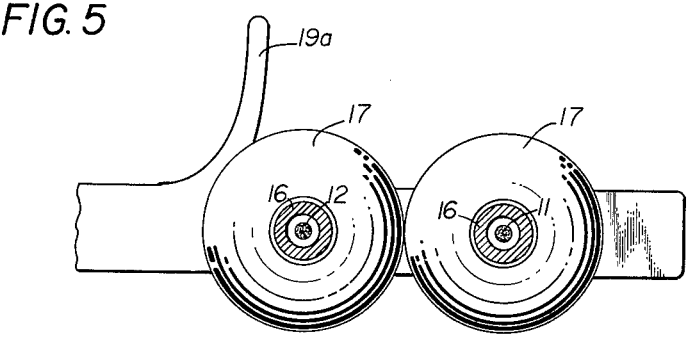
FIG. 5 is a view similar to FIG. 4 but showing another embodiment of the invention.

The track 10 not only provides good characteristics and traction but also provides superior turning characteristics so that turning of the vehicle can be accomplished with less sideslip and in a shorter distance because of the longitudinally and axially aligned tires 17. The tires 17 are preferably shaped as segments of spheres, spheroids, or flattened spheres, FIGS. 1–5. As shown in FIG. 3, the tire 17 has an annular cavity or tore 17a for added resiliency.

By providing tubes 16 of different lengths, the spacing between the grousers 15 can be varied for obtaining maximum traction in soft terrain from grousers 15 of a given height. Moreover, this "spaced-link" effect can make a grouser 15 more effective when its height is increased. It is generally recognized that for a given spacing between grousers, traction increases with an increase of grouser height up to a point where there is no increase in traction though the grouser height may be further increased, unless the spacing between grousers 15 is increased. Similarly, the same rule applies to the tires 17. This means that in soft terrain, tire traction can be varied by varying the diameter and spacing of the tires 17.

As pointed out hereinabove, the rotatable adjacent tires 17 are laterally spaced from each other a sufficient distance to prove good self-cleaning action. However, in FIG. 5, the adjacent tires 17 are laterally positioned close together so as to be contiguous or almost contiguous when not in ground engagement. But when the tires 17 are held in ground engagement by the bogies 22, the tires 17 are close enough together and sufficiently resilient to provide, under compression, a mutual braking action against rotation. Accordingly, when compressed, the tires 17 provide good track resistance to sideslip and for traction in the fore and aft directions. The turnability and self-cleaning characteristics of the track 10 shown in FIGS. 1–4 is better than that of the track shown in FIG. 5 because the tires 17 are not braked against turning as in FIG. 5. However, the resistance of the track of FIG. 5 to sideslip is enhanced. When every other outer tire 17 is removed in FIG. 5, this braking against sideslip of the track 10 is materially reduced. Increased traction in soft terrain is paid for with reduced resistance to sideslip.

It will be understood that this invention can be modified to adapt it to various circumstances and conditions, and it is accordingly desired to comprehend within the purview of this invention such modifications as may be considered to fall within the scope of the appended claims.

What is claimed is:

1. An endless track for a track laying vehicle comprising,
   a plurality of endless cables,
   a plurality of transverse grousers carried by said cables,
   a plurality of tube segments carried by said cables and interposed between said grousers for holding said grousers in spaced relationship,
   resilient tire means carried by said tube segments, and
   rounded means fixed to the center of each of said grousers adapted to engage and mesh with and be driven by a toothed sprocket drive wheel of the track laying vehicle,
   said cables being arranged in pairs on either side of said sprocket wheel engaging means, and each pair of said cables being spaced apart far enough to permit said resilient tire means to freely turn when not under load but to forcibly engage each other for each braking the turning action of the other when under a predetermined load.

2. An endless track for a track laying vehicle comprising,
   a plurality of parallel endless cables,
   a plurality of transverse grousers carried by said cables, and
   at least two deformable tires carried by said cables between adjacent grousers and freely rotatable about an axis parallel to the direction of motion of the track when not deformed, and said two deformable tires forcibly engaging each other when deformed under load and mutually braking each other against rotation.

3. An endless track for a vehicle comprising,
   a plurality of endless cables,
   a plurality of transverse grousers carried by said cables,
   a plurality of spacers carried by said cables and interposed between said grousers for holding said grousers in spaced relationship,
   tire means carried by said spacers, and
   rounded means fixed to the center of each of said grousers adapted to engage and mesh with and be driven by a drive wheel of the vehicle,
   said cable being arranged in pairs on either side of said wheel engaging means, and each pair of said cables being spaced apart far enough to permit said tire means to freely turn when not under load but to forcibly engage each other for each braking the turning action of the other when under a predetermined load.

4. An endless track for a track laying vehicle comprising,
   a plurality of endless cables,
   a plurality of transverse grousers carried by said cables, and
   at least two deformable rollers carried by said cables between adjacent grousers, and said rollers forcibly engaging each other and mutually braking each other against rotation when deformed under load.

5. An endless track for a track laying vehicle comprising,
    annulus means,
    a plurality of transverse elements carried by said annulus means,
    deformable means carried by said annulus means between said transverse elements and freely rotatable about an axis parallel to the direction of motion of the track when not deformed, said deformable means forcibly engaging each other and mutually braking each other against rotation when under compression, and
    spacer means for holding said transverse elements in spaced relationships.

6. An endless track for a track laying vehicle comprising,
    a plurality of parallel annular cables,
    a plurality of flat rectangular transverse grousers carried by said cable,
    a plurality of tube segments carried by said cables and interposed between said grousers for holding said grousers in substantially equally spaced apart parallel relationship along said cables,
    resilient wheel means of spheroid configuration carried by said tube segments, and
    rounded means connected to the center of each of said grousers adapted to engage and mesh with and be driven by a toothed sprocket drive wheel of the track laying vehicle,
    said cables being arranged in pairs on either side of said sprocket wheel engaging means, and each pair of said cables being spaced apart far enough to permit adjacent ones of said resilient wheel means to forcibly engage each other for each braking any turning action of the other when under a predetermined load.

7. An endless track as set forth in claim 6, wherein
    each of said tube segments has spherically rounded ends, and
    each of said grousers has spherically-shaped concavities adapted to seat said spherically rounded ends of said tube segments.

8. An endless track as set forth in claim 5, wherein
    said sprocket wheel engaging means of said grousers have U-shaped projections adapted to conform to the contour of the bogie wheels and guide the track relative thereto.

9. An endless track for a track laying vehicle comprising,
    a plurality of cleats,
    a plurality of endless cables,
    a plurality of tube segments carried by said cables and interposed between said cleats for holding said cleats in spaced relationship,
    resilient wheel means carried by said tube segments, and
    rounded means fixed to the center of each of said cleats adapted to engage and mesh with and be driven by a toothed sprocket drive wheel of the track laying vehicle,
    said cables being arranged in pairs on either side of said sprocket wheel engaging means, and each pair of said cables being spaced apart far enough to permit said resilient wheel means to freely turn.

10. An endless track for a track laying vehicle comprising,
    a plurality of endless cables,
    a plurality of transverse grousers carried by said cables,
    a plurality of spacers carried by said cables and interposed between said grousers for holding said grousers in spaced relationship,
    tire means carried by said spacers, and
    rounded means fixed to the center of each of said grousers adapted to mesh with and be driven by a toothed sprocket drive wheel of the track laying vehicle,
    said cables being arranged in pairs on either side of said sprocket wheel engaging means, and each pair of said cables being spaced apart far enough to permit said tire means to freely turn.

11. An endless track for a track laying vehicle comprising,
    annulus means,
    a plurality of transverse elements carried by said annulus means,
    deformable means carried by said annulus means between said transverse elements and freely rotatable about an axis parallel to the direction of motion of the track, and
    articulated spacer means having ends contiguous with said transverse elements and holding said transverse elements in spaced apart relationship.

12. An endless track for a track laying vehicle comprising,
    a plurality of parallel annular endless cables,
    a plurality of flat rectangular transverse cleats carried by said cables,
    a plurality of tube segments separate and distinct from said cleats carried by said cables and interposed between said cleats for holding said cleats in substantially equally spaced apart parallel relationship along said cables,
    resilient wheel means of spheroid configuration carried by said tube segments, and
    the center of each of said cleats being adapted to engage and mesh with and be driven by a drive wheel of the track laying vehicle.

13. An endless track for a vehicle comprising,
    a plurality of endless cables,
    a plurality of transverse cleats carried by said cables,
    a plurality of tube segments carried by said cables and interposed between said cleats for holding said cleats in spaced relationship, and
    rounded means fixed to the center of each of said cleats adapted to mesh with and be driven by a drive wheel of the vehicle, and
    said cables being arranged in pairs on either side of said rounded means.

14. A grouser for an endless track of a track laying vehicle having bogie wheels and sprocket wheels comprising,
    a metal plate adapted to engage the ground on one edge thereof, said plate having laterally spaced openings formed therein for permitting cables to pass therethrough, said metal plate having spherical concavities coaxial with said spaced openings on both sides thereof for seating grouser spacers,
    rounded means connected to the center of said plate adapted to engage and mesh with and be driven by the sprocket wheels, and
    horseshoe-shaped bogie wheel guide means centrally connected to said plate for guiding said plate relative to the bogie wheels.

15. An endless track for a track laying vehicle comprising,
    a plurality of parallel annular endless cables,
    a plurality of flat rectangular transverse cleats carried by said cables,
    a plurality of tube segments carried by said cables and interposed between said cleats for holding said cleats in substantially equally spaced apart parallel relationship along said cables, each of said tube segments having spherically rounded ends, each of said cleats having spherically-shaped concavities adapted to seat contiguous ends of said tube segments,
    resilient wheel means of spheroid configuration carried by said tube segments, and the center of each of said cleats being adapted to engage and mesh with and be driven by a drive wheel of the track laying vehicle.

References Cited by the Examiner

UNITED STATES PATENTS

| | | | |
|---|---|---|---|
| 1,632,674 | 6/1927 | Pearson | 305—40 |
| 1,965,244 | 7/1934 | Lamb | 305—40 |
| 2,670,996 | 3/1954 | Leveke | 305—40 |
| 2,695,819 | 11/1954 | Parsons | 305—40 |
| 2,707,658 | 5/1955 | Grenier | 305—35 |
| 2,751,259 | 6/1956 | Bonmartini | 305—52 X |
| 3,063,758 | 11/1962 | Fikse | 305—40 |

FOREIGN PATENTS 925,109   3/1947   France.

BENJAMIN HERSH, *Primary Examiner.*
ARTHUR L. LA POINT, *Examiner.*